US012664718B2

(12) United States Patent
Kim et al.

(10) Patent No.: US 12,664,718 B2
(45) Date of Patent: Jun. 23, 2026

(54) TEXTURE COMPLETION

(71) Applicant: Microsoft Technology Licensing, LLC, Redmond, WA (US)

(72) Inventors: Jongyoo Kim, Beijing (CN); Jiaolong Yang, Beijing (CN); Xin Tong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/279,717

(22) PCT Filed: Apr. 26, 2021

(86) PCT No.: PCT/CN2021/090047
§ 371 (c)(1),
(2) Date: Aug. 31, 2023

(87) PCT Pub. No.: WO2022/226744
PCT Pub. Date: Nov. 3, 2022

(65) Prior Publication Data
US 2024/0161382 A1 May 16, 2024

(51) Int. Cl.
*G06T 11/00* (2006.01)
*G06T 7/40* (2017.01)
(Continued)

(52) U.S. Cl.
CPC ................ *G06T 15/04* (2013.01); *G06T 7/40* (2013.01); *G06T 7/70* (2017.01); *G06V 10/54* (2022.01);
(Continued)

(58) Field of Classification Search
CPC ........... G06T 15/04; G06T 2207/20081; G06T 2207/30201
(Continued)

(56) References Cited

U.S. PATENT DOCUMENTS

| | | | |
|---|---|---|---|
| 10,242,484 B1 * | 3/2019 | Cernigliaro | ............. G06T 9/008 |
| 10,389,994 B2 | 8/2019 | Graziosi | |
| 2020/0151940 A1 * | 5/2020 | Yu | ........................ G06V 40/168 |

FOREIGN PATENT DOCUMENTS

| | | |
|---|---|---|
| CN | 110378230 A | 10/2019 |
| CN | 111881926 A | 11/2020 |

(Continued)

OTHER PUBLICATIONS

Fan et al., Full Face-and-Head 3D Model With Photorealistic Texture, Oct. 27, 2020, Digital Object Identifier 10.1109/Access. 2020.3031886, vol. 8, 2020, pp. 210709-210721 (Year: 2020).*

(Continued)

*Primary Examiner* — Samantha (Yuehan) Wang
(74) *Attorney, Agent, or Firm* — Schwegman Lundberg & Woessner, P.A.

(57) ABSTRACT

According to implementations of the present disclosure, there is provided a solution for completing textures of an object. In this solution, a complete texture map of an object is generated from a partial texture map of the object according to a texture generation model. A first prediction on whether a texture of at least one block in the complete texture map is an inferred texture is determined according to a texture discrimination model. A second image of the object is generated based on the complete texture map. A second prediction on whether the first image and the second image are generated images is determined according to an image discrimination model. The texture generation model, the texture and image discrimination models are trained based on the first and second predictions.

14 Claims, 7 Drawing Sheets

(51) Int. Cl.
    *G06T 7/70*        (2017.01)
    *G06T 15/04*       (2011.01)
    *G06V 10/54*       (2022.01)
    *G06V 20/70*       (2022.01)
(52) U.S. Cl.
    CPC .... *G06V 20/70* (2022.01); *G06T 2207/20081*
                                              (2013.01)
(58) Field of Classification Search
    USPC ........................................................ 345/582
    See application file for complete search history.

(56)                References Cited

FOREIGN PATENT DOCUMENTS

WO          2017123163  A1      7/2017
WO          2018102700  A1      6/2018

OTHER PUBLICATIONS

Office Action received for EP Application No. 21938235.5, mailed on Date Dec. 5, 2023, 3 Pages.
Blanz, et al., "A Morphable Model for the Synthesis of 3D Faces", In Proceedings of the 26th annual conference on Computer graphics and interactive techniques, Jul. 1999, pp. 187-194.
Booth, et al., "3D Face Morphable Models "In-the-Wild"", In Proceedings of In IEEE Conference on Computer Vision and Pattern Recognition, Jul. 21, 2017, pp. 48-57.
Booth, et al., "A 3D Morphable Model Learnt from 10,000 faces", In Proceedings of IEEE Conference on Computer Vision and Pattern Recognition, Jun. 27, 2016, pp. 15543-5552.
Deng, et al., "Accurate 3D Face Reconstruction with Weakly-Supervised Learning: From Single Image to Image Set", In Proceedings of the IEEE/CVF Conference on Computer Vision and Pattern Recognition Workshops, Jun. 16, 2019, pp. 285-295.
Deng, et al., "UV-GAN: Adversarial Facial UV Map Completion for Pose-Invariant Face Recognition", In Proceedings of IEEE Conference on Computer Vision and Pattern Recognition, Jun. 18, 2018, pp. 7093-7102.
Fan, et al., "Full Face-and-Head 3D Model With Photorealistic Texture", In Journal of IEEE Access, vol. 8, Oct. 27, 2020, pp. 210709-210721.
Feng, et al., "Joint 3D Face Reconstruction and Dense Alignment with Position Map Regression Network", In Proceedings of the European Conference on Computer Vision, Sep. 8, 2018, 18 Pages.
Gecer, et al., "GANFIT: Generative Adversarial Network Fitting for High Fidelity 3D Face Reconstruction", In Proceedings of the IEEE/CVF Conference on Computer Vision and Pattern Recognition, Jun. 15, 2019, pp. 1155-1164.
Gecer, et al., "OSTeC: One-Shot Texture Completion", In Repository of arxiv code: 2012.15370v1 [cs.CV], Dec. 30, 2020, 19 Pages.
Genova, et al., "Unsupervised Training for 3D Morphable Model Regression", In Proceedings of the IEEE Conference on Computer Vision and Pattern Recognition, Jun. 18, 2018, pp. 8377-8386.
Guo, et al., "CNN-Based Real-Time Dense Face Reconstruction with Inverse-Rendered Photo-Realistic Face Images", In Journal of IEEE Transactions on Pattern Analysis and Machine Intelligence, vol. 41, Issue, 6, 2018, 16 Pages.
Hassner, et al., "Effective Face Frontalization in Unconstrained Images", In Proceedings of IEEE Conference on Computer Vision and Pattern Recognition, Jun. 2015, 10 Pages.
Ichim, et al., "Dynamic 3D Avatar Creation from Hand-held Video Input", In Journal of ACM Transactions on Graphics, vol. 34, Issue 4, Jul. 27, 2015, 14 Pages.
Iizuka, et al., "Globally and Locally Consistent Image Completion", In Journal of ACM Transactions on Graphics, vol. 36, Issue 4, Jul. 20, 2017, 14 Pages.

Isola, et al., "Image-to-Image Translation with Conditional Adversarial Networks", In Proceedings of IEEE Conference on Computer Vision and Pattern Recognition, Jul. 21, 2017, pp. 1125-1134.
Karra, et al., "A Style-Based Generator Architecture for Generative Adversarial Networks", In Proceedings of in IEEE Conference on Computer Vision and Pattern Recognition, Jun. 15, 2019, pp. 4401-4410.
Karras, et al., "Progressive Growing of GANs for Improved Quality, Stability, and Variation", In Proceedings of 6th International Conference on Learning Representations, Apr. 30, 2018, 26 Pages.
Lazova, et al., "360-Degree Textures of People in Clothing from a Single Image", In Proceedings of International Conference on 3D Vision, Sep. 16, 2019, 11 Pages.
Lee, et al., "StyleUV: Diverse and High-quality UV Map Generative Model", In Repository of arXiv:2011.12893v1, Nov. 25, 2020, 12 Pages.
Li, et al., "Recurrent Feature Reasoning for Image Inpainting", In Proceedings of IEEE International Conference on Computer Vision, Jun. 13, 2020, pp. 7760-7768.
Lin, et al., "Cocogan: Generation by Parts via Conditional Coordinating", In Proceedings of IEEE International Conference on Computer Vision, Oct. 27, 2019, pp. 4512-4521.
Lin, et al., "Face Parsing With Rol Tanh-Warping", In Proceedings of the IEEE/CVF Conference on Computer Vision and Pattern Recognition, Jun. 15, 2019, pp. 5647-5656.
Liu, et al., "Image Inpainting for Irregular Holes Using Partial Convolutions", In Proceedings of the European Conference on Computer Vision, Sep. 8, 2018, 16 Pages.
Mao, et al., "Least Squares Generative Adversarial Networks", In Proceedings of IEEE International Conference on Computer Vision, Oct. 22, 2017, pp. 2813-2821.
Nguyen, et al., "Dual Discriminator Generative Adversarial Nets", In Proceedings of the 31st International Conference on Neural Information Processing Systems, Sep. 2017, 11 Pages.
Odena, et al., "Conditional Image Synthesis with Auxiliary Classifier GANs", In Proceedings of the 34th International Conference on Machine Learning, Aug. 2017, 10 Pages.
Olszewski, Kyle, "Realistic Dynamic Facial Textures from a Single Image using GANs", In Proceeding of IEEE International Conference on Computer Vision, Oct. 22, 2017, pp. 5439-5448.
Park, et al., "SRFeat: Single Image Super-Resolution with Feature Discrimination", In Proceedings of the European Conference on Computer Vision, Sep. 2018, 17 Pages.
Parkhi, et al., "Deep Face Recognition", In Proceedings of British Machine Vision Conference, Sep. 2015, 12 Pages.
Pathak, et al., "Context Encoders: Feature Learning by Inpainting", In Proceedings of the IEEE Conference on Computer Vision and Pattern Recognition, Jun. 26, 2016, pp. 2536-2544.
Pavllo, et al., "Convolutional Generation of Textured 3D Meshes", In Proceedings of the 34th Conference on Neural Information Processing Systems, Jun. 2020, 13 Pages.
Paysan, et al., "A 3D Face Model for Pose and Illumination Invariant Face Recognition", In Proceedings of the Sixth IEEE International Conference on Advanced Video and Signal Based Surveillance, Sep. 2, 2009, pp. 296-301.
"International Search Report and Written Opinion Issued in PCT Application No. PCT/CN21/090047", Mailed Date: Feb. 7, 2022, 9 Pages.
Ploumpis, et al., "Combining 3D Morphable Models: A Large scale Face-and-Head Model", In Proceedings of IEEE Conference on Computer Vision and Pattern Recognition, Jun. 16, 2019, pp. 10934-10943.
Richardson, et al., "3D Face Reconstruction by Learning from Synthetic Data", In Proceedings of Fourth International Conference on 3D Vision, Oct. 25, 2016, pp. 460-469.
Saito, et al., "Photorealistic Facial Texture Inference Using Deep Neural Networks", In Proceedings of IEEE Conference on Computer Vision and Pattern Recognition, Jul. 21, 2017, pp. 5144-5153.
Sengupta, et al., "SfSNet: Learning Shape, Reflectance and Illuminance of Faces in the wild", In Proceedings of the IEEE Conference on Computer Vision and Pattern Recognition, Jun. 18, 2018, 10 Pages.

(56) References Cited

OTHER PUBLICATIONS

Wang, et al., "High-Resolution Image Synthesis and Semantic Manipulation With Conditional GANs", In Proceedings of the IEEE Conference on Computer Vision and Pattern Recognition, Jun. 18, 2018, pp. 8798-8807.

Wang, et al., "Image Quality Assessment: From Error Visibility to Structural Similarity", In Journal of IEEE Transactions on Image Processing, vol. 13, Issue 4, Apr. 13, 2004, pp. 600-612.

Xu, et al., "Deep 3D Portrait from a Single Image", In Proceedings of IEEE/CVF Conference on Computer Vision and Pattern Recognition, Jun. 13, 2020, pp. 7710-7720.

Yamaguchi, et al., "High-Fidelity Facial Reflectance and Geometry Inference from an Unconstrained Image", In Journal of ACM Transactions on Graphics, vol. 37, Issue 4, Jul. 2018, 14 Pages.

Yang, et al., "FaceScape: A Largescale High Quality 3D Face Dataset and Detailed Riggable 3D Face Prediction", In Proceedings of the IEEE/CVF Conference on Computer Vision and Pattern Recognition, Apr. 2020, pp. 601-610.

Yu, et al., "Free-Form Image Inpainting with Gated Convolution", In Proceedings of IEEE/CVF International Conference on Computer Vision, Oct. 27, 2019, pp. 4470-4479.

Yu, Jiahui, "Generative Image Inpainting with Contextual Attention", In Proceedings of the IEEE/CVF Conference on Computer Vision and Pattern Recognition, Jun. 18, 2018, pp. 5505-5514.

Yu, et al., "Multi-Scale Context Aggregation by Dilated Convolutions", In Proceedings of International Conference on Learning Representations, May 2, 2016, 13 Pages.

Yuan, et al., "Face De-occlusion using 3D Morphable Model and Generative Adversarial Network", In Proceedings of IEEE/CVF International Conference on Computer Vision, Oct. 2019, pp. 10062-10071.

Zheng, et al., "Pluralistic Image Completion", In Proceedings of IEEE/CVF Conference on Computer Vision and Pattern Recognition, Jun. 15, 2019, pp. 1438-1447.

Kim, et al., "Learning High-Fidelity Face Texture Completion without Complete Face Texture", In Proceedings of IEEE/CVF International Conference on Computer Vision, Oct. 10, 2021, pp. 13990-13999.

Lin, et al., "Towards High-Fidelity 3D Face Reconstruction from In-the-Wild Images using Graph Convolutional Networks", In Proceedings of IEEE/CVF Conference on Computer Vision and Pattern Recognition, Jun. 13, 2020, pp. 5890-5899.

Lattas, et al., "AvatarMe: Realistically Renderable 3D Facial Reconstruction "In-the-Wild"", In Proceedings of IEEE/CVD Conference on Computer Vision and Pattern Recognition, Jun. 13, 2020, pp. 757-766.

Kingma, et al., "ADAM: A Method for Stochastic Optimization", In Proceedings of 3rd International Conference on Learning Representations, May 7, 2015, 15 Pages.

Gross, et al., "Multi-Pie", In Journal of Image and Vision Computing, vol. 28, Issue 5, May 1, 2010, 21 Pages.

Dai, et al., "SGNN: Sparse Generative Neural Networks for Self-Supervised Scene Completion of RGB-D Scans", In Proceedings of IEEE Conference on Computer Vision and Pattern Recognition, Jun. 13, 2020, pp. 846-855.

Abadi, et al., "TensorFlow: Large-Scale Machine Learning on Heterogeneous Distributed Systems", In Publication of Preliminary White Paper, Nov. 9, 2015, 19 Pages.

Extended European search report received for European Application No. 21938235.5, mailed on Jan. 16, 2025, 7 pages.

Kim, et al., "Learning High-Fidelity Face Texture Completion Without Complete Face Texture", Proceedings of the IEEE/CVF International Conference on Computer Vision (ICCV), Oct. 10, 2021, pp. 13990-13999.

Xue, et al., "Side Information for Face Completion: a Robust PCA Approach", Retrieved from: arXiv: 1801.07580v1, Jan. 20, 2018, 15 pages.

Yu, et al., "Generative Image Inpainting with Contextual Attention", In Proceedings of IEEE/CVF Conference on Computer Vision and Pattern Recognition, Jun. 18, 2018, pp. 5505-5514.

Communication pursuant to Rules 70(2) and 70a(2) received for European Application No. 21938235.5 mailed on Feb. 4, 2025, 1 page.

First Office Action Received for Chinese Application No. 202180097514.1, mailed on Mar. 17, 2026, 31 pages. (English translation Provided).

* cited by examiner

300

172          173

320          330

400

410    420

430    440

☐ VALID    ☐ INVALID

700

710

OBTAIN A PARTIAL TEXTURE MAP OF A FURTHER OBJECT

720

GENERATE A COMPLETE TEXTURE MAP OF THE FURTHER OBJECT
FROM THE PARTIAL TEXTURE MAP ACCORDING TO A TEXTURE
GENERATION MODEL

TEXTURE COMPLETION

CLAIM OF PRIORITY

This application is a U.S. National Stage Filing under 35 U.S.C. 371 of International Patent Application Serial No. PCT/CN2021/090047, filed Apr. 26, 2021, and published as WO 2022/226744 A1 on Nov. 3, 2022, which application is incorporated herein by reference in its entirety.

BACKGROUND

In the field of computer vision, human face analysis and digitization have become one of the most popular topics. Most face images do not represent a full view of a face due to occlusion by the face itself or other objects. In fact, self-occlusion is ubiquitous for face images, leading to invisible textures in the face images. Accordingly, face texture completion is needed to infer the invisible face textures and recover full-face appearance. The face texture completion has a wide variety of applications, for example three-dimension (3D) avatar creation, 3D Morphable Model (3DMM) construction, and face image manipulation, as well as high-level vision tasks such as face recognition.

SUMMARY

According to implementations of the present disclosure, there is provided a solution for completing textures of an object, for example, a face. In this solution, a complete texture map of an object is generated from a partial texture map of the object according to a texture generation model. The partial texture map comprises visible textures in a first image of the object and the complete texture map comprises the visible textures and inferred textures. In the texture space, a first prediction on whether a texture of at least one block in the complete texture map is an inferred texture is determined according to a texture discrimination model. In the image space, a second image of the object is generated based on the complete texture map and a second prediction on whether the first image and the second image are generated images is determined according to an image discrimination model. Then, the texture generation model, the texture discrimination model and the image discrimination model are trained based on the first and second predictions. In this way, the trained texture generation model can generate complete textures with high-fidelity.

The Summary is to introduce a selection of concepts in a simplified form that are further described below in the Detailed Description. The Summary is not intended to identify key features or essential features of the present disclosure, nor is it intended to be used to limit the scope of the present disclosure.

BRIEF DESCRIPTION OF THE DRAWINGS

Throughout the drawings, the same or similar reference symbols refer to the same or similar elements.

DETAILED DESCRIPTION OF IMPLEMENTATIONS

Figure 1:
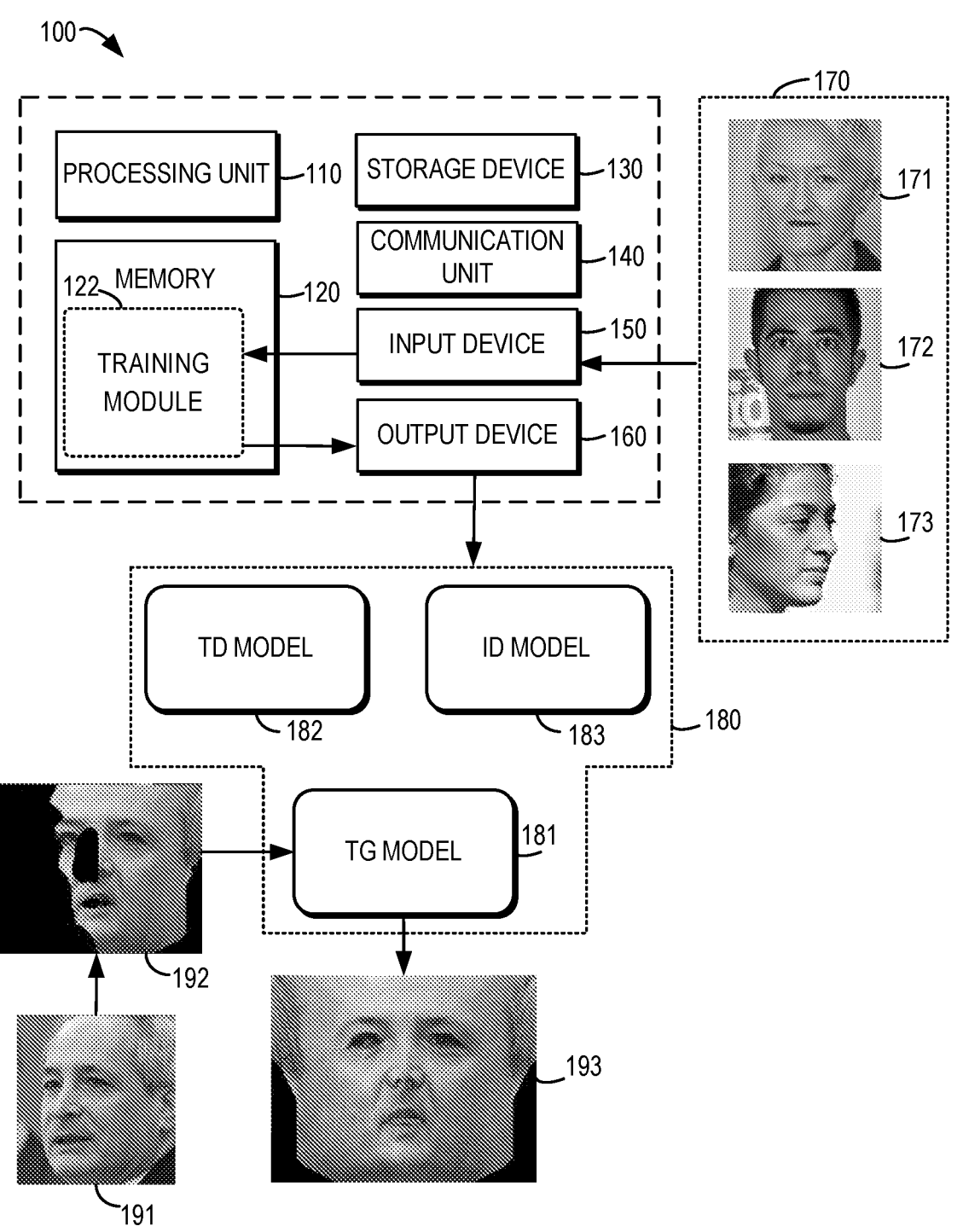
FIG. 1 illustrates a block diagram of a computing device in which various implementations of the present disclosure can be implemented.

Principles of the present disclosure will now be described with reference to some example implementations. It is to be understood that these implementations are described only for the purpose of illustration and help those skilled in the art to better understand and thus implement the present disclosure, without suggesting any limitations to the scope of the subject matter disclosed herein.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

As used herein, a "machine learning model" is an AI model, which may also be referred to as a "learning model", "learning network", "network model", or "model." These terms are used interchangeably hereinafter. A deep learning model is one example machine learning model, examples of which include a "neural network." A parameter set of the machine learning model is determined through a training phrase of the model based on training data. The trained machine learning model maps a received input to a corresponding output using the trained parameter set. Therefore, the training process of a machine learning model may be considered as learning, from the training data, a mapping or association between the input and the output.

As used herein, the term "texture" refers to an appearance of an object on an image, rather than an albedo or intrinsic image. For example, a face texture refers to a facial appearance on an image. Accordingly, the term "texture map" refers to a representation of textures of the object in the image. For example, the texture map may be implemented as a UV map.

As briefly mentioned above, face texture completion is needed to infer the invisible face textures and recover full-face appearance. However, learning face texture completion is not straightforward due to difficulties in collecting training images with complete textures. For single images, obtaining complete textures by manually labeling or painting is not viable. Using multi-view images to obtain high-resolution and high-quality textures is also not a trivial task, which requires sophisticated face image capture and processing pipelines. In some conventional approaches, special devices (such as a multi-view Digital Single Lens Reflex Camera capturing system or a 3D scanning system) placed in controlled environments are used to capture training images. Most images from conventional approaches are not publicly available. Therefore, conventional texture completion solutions using training images with complete textures cannot efficiently learn face texture completion.

In view of the above, it is desired to avoid collecting training images with complete textures and use a large collection of face images captured in unconstrained settings to train a texture completion model. Although such a desired solution would eliminate the need for obtaining complete textures, it poses new challenges for learning the texture completion model. That is, for each training image, there's no image of the same face that can be used for supervision. Similar problems exist for the texture completion of other objects.

According to implementations of the present disclosure, there is proposed a solution for completing textures of an object, for example, a human face, a human body. In this solution, a Generative Adversarial Network (GAN) comprising a texture generation model, a texture discrimination model and an image discrimination model is trained to learn texture completion. Specifically, a complete texture map of an object is generated from a partial texture map of the object according to the texture generation model. The partial texture map comprises visible textures in a first image of the object and the complete texture map comprises the visible textures and inferred textures. In the texture space, a first prediction on whether a texture of at least one block in the complete texture map is an inferred texture is determined according to the texture discrimination model. In the image space, a second image of the object is generated based on the complete texture map and a second prediction on whether the first image and the second image are generated images is determined according to the image discrimination model. Then, the texture generation model, the texture discrimination model and the image discrimination model are trained based on the first and second predictions.

Through the use of the two discrimination models in the texture space and the image space, texture completion can be learnt without any complete textures in an unsupervised fashion. The texture discrimination model in the texture space facilitates learning of texture details, while the image discrimination model in the image space facilitates learning of the structure of the object. In this way, the trained texture generation model can generate complete textures with high-fidelity.

Example implementations of the present disclosure will be discussed in detail below with reference to FIGS. 1-6. It is to be understood that although the present disclosure includes a detailed description on texture completion of human faces, implementations of the present disclosure are not limited to texture completion of human faces. Rather, the implementations of the present disclosure are applicable to texture completion of objects which share a similar structural topology. More specifically, texture maps of such objects should have the same UV topology and the same position in the texture maps should have similar semantics. Examples of such objects include, but are not limited to, such as human faces, human bodies, faces or bodies of a certain kind of animals (e.g., cats).

Example Environment

FIG. 1 illustrates a block diagram of a computing device 100 that can carry out a plurality of implementations of the present disclosure. It should be understood that the computing device 100 shown in FIG. 1 is only exemplary, without suggesting any limitation to functions and the scope of the implementations of the present disclosure. According to FIG. 1, the computing device 100 includes a computing device 100 in the form of a general purpose computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include a training module 122 configured to execute functions of various implementations described herein. The training module 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the present disclosure. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 can train a GAN for texture completion in accordance with various implementations of the present disclosure. As shown in FIG. 1, the computing device 100 can receive, via the input device 150, a training dataset 170 comprising a plurality of training images, for example training images 171, 172 and 173 as shown in FIG. 1. Each of the training images 171, 172 and 173 comprises a human face. As shown in FIG. 1, faces in the training images 171, 172 and 173 are not presented in a full view due to self-occlusion or a pose of the face. It is to be understood that the number of training images in the training dataset 170 and poses of the faces are shown for the purpose of illustration without any limitation to the protection scope.

The computing device 110 trains a GAN 180 for texture completion by using the training dataset 170. The GAN 180 comprises a texture generation (TG) model 181, a texture discrimination (TD) model 182 and an image discrimination (ID) model 183. The TG model 181 is configured to generate a complete texture map of an object (for example, a human face) from a partial texture map of the object. The complete texture map comprises inferred textures invisible in a training image. The TD model 182 is a discriminator in the texture space, which is used to discriminate the inferred textures and visible textures in the training images. The ID model 183 is a discriminator in the image space, which is used to discriminate the training images and images generated from the complete texture maps. The GAN 180 comprising both the TD model 182 and the ID model 183 is also referred to as a Dual-Space-Discriminator Generative Adversarial Network (DSD-GAN).

After training, the trained TG model 181 may be output by the computing device 100. Alternatively, or in addition, the trained TG model 181 may be used by the computing device 100 to generate a complete texture map of a target object. For example, as shown in FIG. 1, a partial texture map 192 corresponding to a face image 191 is input to the trained TG model 181. The trained TG model 181 generates a complete texture map 193 of the face in the face image 191.

Example Training Architecture

Figure 2:
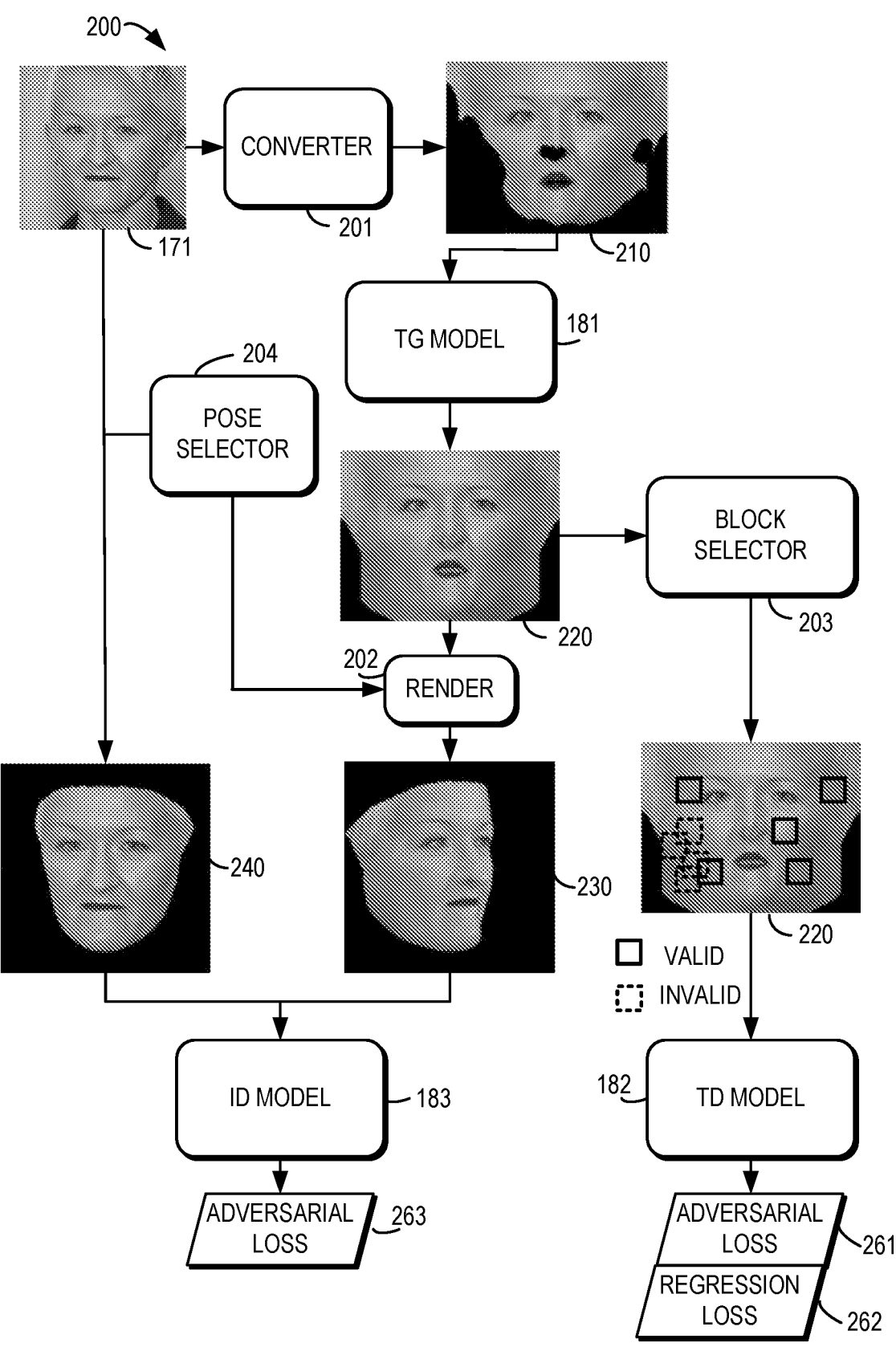
FIG. 2 illustrates a block diagram of an example training architecture for texture completion in accordance with some implementations of the present disclosure.

FIG. 2 illustrates an example training architecture 200 for texture completion in accordance with some implementations of the present disclosure. In the example training architecture 200, the training image 171 is used as an example to illustrate how to train the TG model 181, the TD model 182 and the ID model 183. In the following, the face comprised in the training image 171 is also referred to as a "reference face".

Partial Texture Map

To obtain visible textures in the training image 171 and generate training data, a partial texture map 210 of the reference face in the training image 171 is generated from the training image 171. The partial texture map 210 comprises visible textures of the reference face in the training image 171. The partial texture map 210 lacks textures of the reference face which are invisible in the training image 171, as shown by some of the black regions. A black region of a partial texture map lacking textures is also referred to as a "hole".

Figure 3:
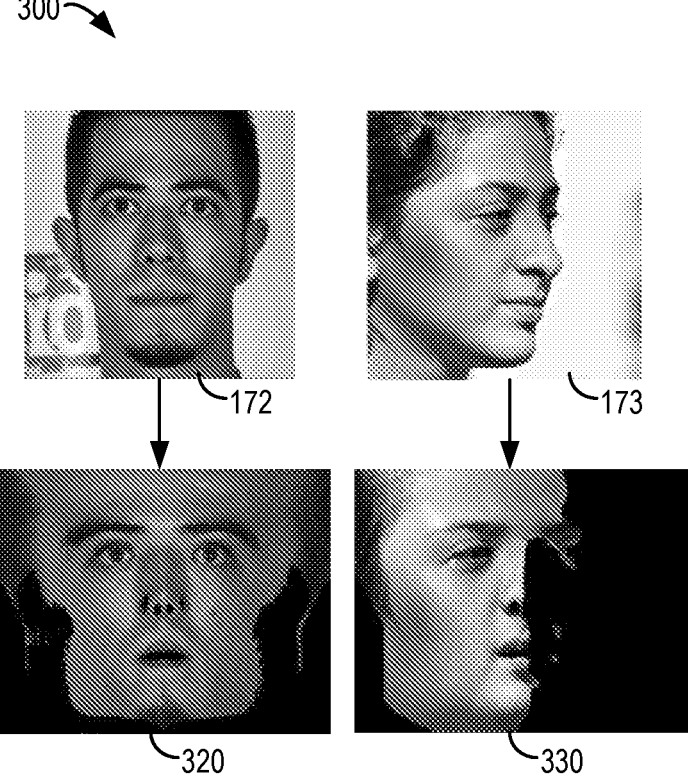
FIG. 3 illustrates example partial texture maps in accordance with some implementations of the present disclosure.

To better understand the partial texture map, reference is now made to FIG. 3. FIG. 3 illustrates further example partial texture maps in accordance with some implementations of the present disclosure. Specifically, FIG. 3 illustrates a partial texture map 320 corresponding to the training image 172 and a partial texture map 330 corresponding to the training image 173. The partial texture map 320 comprises visible textures of the face in the training image 172 and lacks textures of the face which are invisible in the training image 172. Similarly, the partial texture map 330 comprises visible textures of the face in the training image 173 and lacks textures of the face which are invisible in the training image 173.

Reference is now made back to FIG. 2. In some implementations, a converter 201 may be included in the example architecture 200 to generate the partial texture map 210 from the training image 170. As an example, the converter 201 may be implemented as an automated pipeline comprising three steps. In a first step of three-dimension (3D) face reconstruction, any suitable 3D face reconstruction algorithm may be used to reconstruct a 3D face from the training image 171. Results of the 3D face reconstruction may include a face shape, a face pose, face textures, lighting parameters, camera parameters, and the like.

To further improve the accuracy of alignment between partial texture maps of different training images, a second step of 3D geometry refinement is performed subsequently. In the second step, the results of the 3D face reconstruction are refined by using a photometric loss, regularization for 3DMM parameters, and a perceptual distance loss. In addition, a face parsing algorithm is employed to parse the face boundary. This is important to avoid background pixels (that is, non-face pixels) around the face boundary appearing in the texture space. Then, an initial version of the partial texture map is determined based on the reconstructed 3D face and the camera parameters.

The initial version of the partial texture map may be rough and comprise isolated small holes, for example around the nose. In a third step of data cleaning, the initial version of the partial texture map may be simplified by using any suitable morphological operations. As such, the isolated small holes can be removed. Then, background pixels introduced in the texture space can be removed by using the face parsing information generated during the second step. If there are too many background pixels, the training image would be discarded. If the number of background pixels is below a threshold, a final version of the partial texture map is obtained.

It is to be understood that the steps and operations described above with respect to the converter 201 are merely examples. The converter 201 may be implemented with any suitable steps and operations.

Alternatively, in some other implementations, such a converter may not be included. Instead, the training dataset 170 may comprise the partial texture maps 210, 320 and 330 corresponding to the training images 171, 172 and 173, respectively.

Texture Generation Model

A complete texture map 220 of the reference face in the training image 171 is generated from the partial texture map 210 according to the TG model 181. The complete texture map 220 comprises both the visible textures in the training image 171 and inferred textures generated by the TG model 181.

In addition to the partial texture map 210, a visibility mask corresponding to the partial texture map 210 may be input to the TG model 181. Alternatively, the visibility mask may be derived by the TG model 181 based on the partial texture map 210. The visibility mask indicates valid pixels and invalid pixels in the partial texture map 210. A valid pixel refers to a pixel comprising a visible texture from the training image 171 and an invalid pixel refers to a pixel lacking a visible texture from the training image 171. For example, the valid and invalid pixels may be indicated with 1 and 0, respectively.

The TG model 181 may be implemented by any suitable network structure. As an example, the TG model 181 may comprise down-sampling layers, residual blocks, and up-sampling layers. In some implementations, dilated convolutions may be added between the residual blocks to enlarge the receptive field. The dilated convolution is a type of convolution that extends a convolution kernel by inserting holes between kernel elements. In such implementations, the dilated convolutions can facilitate generation of high-resolution images.

For the input of the TG model 181, the partial texture map 210 may be preprocessed with noises. In an example, the partial texture map 210 may be concatenated with a noise texture with a Gaussian random noise image where a noise exists only in the invalid pixels of the partial texture map 210. Then, the concatenated partial texture map 210 and noise texture are flipped horizontally and concatenated with the original partial texture map 210 to impose a weak symmetric consistency. In this example, noises are combined with the partial texture map 210 as another channel without changing RGB values of the partial texture map 210. Alternatively, in another example, the noise texture may be added to the partial texture map 210 such that the RGB value of each invalid pixel is changed based on the noise texture. In this example, noises are combined with the partial texture map 210 without changing the number of channels of the partial texture map 210. It is to be understood that the above examples of preprocessing the partial texture map 210 are given for the purpose of illustration without any limitation to the protection scope. The partial texture map 210 can be preprocessed with any suitable manner.

In the following, the partial texture map 210 is denoted as $T_{inc}$, the visibility mask is denoted as $M_{tex}$ and the complete texture map 220 is denoted as $T_{pred}$. The output of the texture generation model 181 is used to calculate a self-reconstruction loss for the valid pixels as the following equation (1):

$$\mathcal{L}_{rec} = \frac{1}{\sum_{(i,j)} M_{tex\,(i,j)}} \sum |(T_{inc} - T_{pred}) \odot M_{tex}| \tag{1}$$

where (i,j) denotes pixels in the complete texture map and $\odot$ is a Hadamard product.

It is to be understood that the above network structure and processing on the partial texture map 210 are merely examples. The protection scope of the present disclosure is not limited in this regard.

Texture Discrimination Model

Subsequent processing of the complete texture map 220 comprises processing in the texture space and processing in the image space. In the texture space, a block selector 203 is used to select at least one block in the complete texture map 220. As used herein, a block in a texture map refers to a region comprising a plurality of pixels of the texture map. The selected at least one block is to be used for the TD model 182.

To this end, a plurality of candidate blocks is determined from the complete texture map 220. In some implementations, the complete texture map 220 may be divided into the plurality of candidate blocks. Accordingly, candidate blocks of the plurality of candidate blocks are not overlapped with each other.

In some implementations, the plurality of candidate blocks may be defined by a sliding crop window with a stride $stride_c$ and a cropping size $width_c$. Accordingly, some candidate blocks of the plurality of candidate blocks are overlapped with each other. The cropping size $width_c$, which is the size of a candidate block, may be optimized dependent on the width $width_f$ of the complete texture map 220. If the cropping size $width_c$ is too small, the TD model 182 is less likely to catch important textural patterns, while a large cropping size $width_c$ would result in less candidate blocks. As an example, the stride $stride_c$ may be set as $width_f/32$ and the cropping size $width_c$ may be set as $stride_c \times 2$. It is to be understood that the above values of the stride and cropping size are merely for the purpose of illustration without any limitation to the protection scope.

The at least one block to be used for the TD model 182 is selected from the plurality of candidate blocks. In some implementations, a ratio of the number of valid pixels to the number of the plurality of pixels is determined for each of the plurality of candidate blocks. The ratio may be calculated by using the visibility mask $M_{tex}$. If the ratio exceeds a first threshold, the candidate block is classified as a valid block, which means that most textures of the block are visible in the training image 171. If the ratio is below a second threshold, the candidate block is classified as an invalid block, which means that most textures of the block are inferred by the TG model 181. If the ratio is between the first and second thresholds, the candidate block is classified as a rest block. As an example, the first threshold may be 0.9 and the second threshold may be 0.65. It is to be understood that the above values of the first and second thresholds are merely for the purpose of illustration without any limitation to the protection scope.

Figure 4:
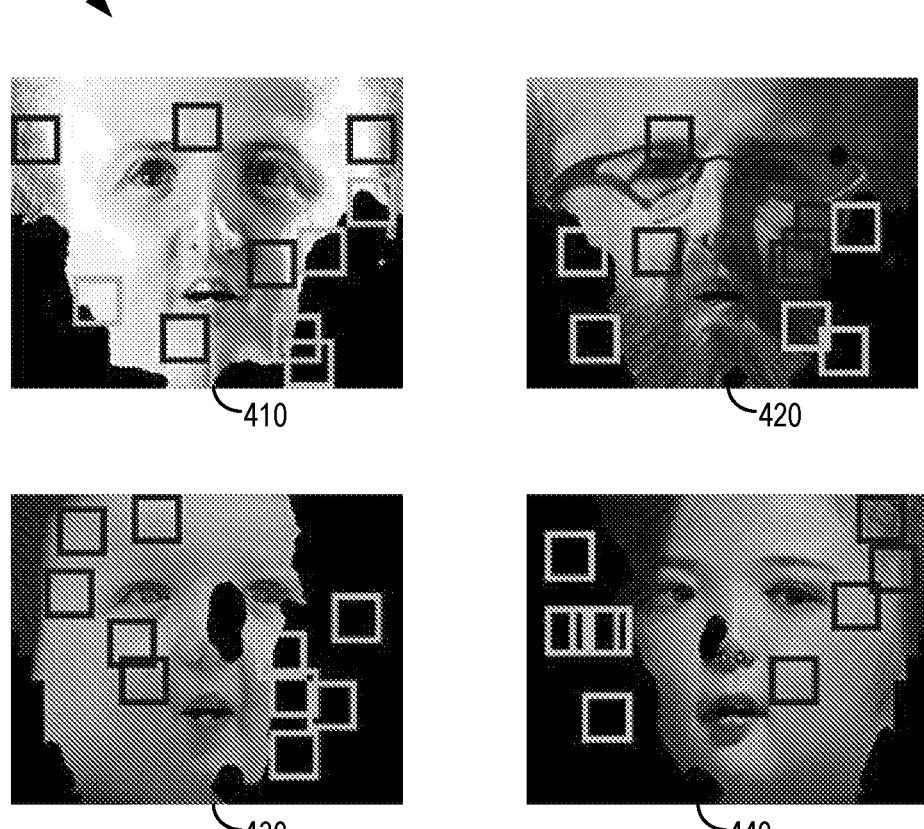
FIG. 4 illustrates example valid blocks and invalid blocks in accordance with some implementations of the present disclosure.

The candidate blocks which are classified as the valid block or the invalid block are selected for inputting into the TD model 182. FIG. 2 shows some examples of valid blocks and invalid blocks overlaid on the complete texture map 220. Reference is now made to FIG. 4. FIG. 4 illustrates example valid blocks and invalid blocks in accordance with some implementations of the present disclosure. For the purpose of illustration only, the example valid blocks and invalid blocks are shown overlaid on the partial texture maps 410, 420, 430 and 440. However, it is to be understood that the valid blocks and invalid blocks are selected from the complete texture maps.

Reference is now made back to FIG. 2. The selected blocks, which may comprise both the valid blocks and the invalid blocks, are input into the TD model 182. Accordingly, the valid blocks may be assigned with a label of 1 and the invalid blocks may be assigned with a label of 0. The TD model 182 determines a prediction (which is also referred to as "first prediction") on whether each of the selected blocks comprises an inferred texture. In other word, the TD model 182 determines a prediction on whether each of the selected blocks is an invalid block or a valid block. The invalid block can be considered as a fake block and the valid block can be considered as a real block. Then, an adversarial loss 261 is calculated as the following equation (2):

$$\mathcal{L}_{loc} = \underset{C_{val}}{\mathbb{E}}\left[(D_T(C_{val})-1)^2\right] - \underset{C_{hol},z}{\mathbb{E}}\left[D_T(C_{hol})^2\right] \qquad (2)$$

where $D_T(\cdot)$ denotes the TD model 182, $C_{val}$ denotes the valid blocks, $C_{hol}$ denotes the invalid blocks, and z denotes the random noise concatenated with or added to the invalid pixels of the partial texture map 210, as described above.

Given that face textures have a canonical structure, there is a strong relationship between texture patterns and positions of the blocks in the complete texture map 220. For example, beard exists only around the mouth and chin, while cheeks usually have homogeneous textures. Therefore, in some implementations, positional information of the blocks may be combined with the textural information of the blocks. As such, semantically correct textures can be learnt.

Specifically, a position of each selected block in the complete texture map 220 may be predicted based on an output of an intermediate layer of the texture discrimination model 182. A difference between the predicted position and an actual position of each selected block in the complete texture map 220 can be determined to train the TG model 181, the TD model 182 and the ID model 183.

In such implementations, the TD model 182 may be implemented as a conditional discriminator and trained by regressing coordinates of the selected blocks in the complete texture map 220. For example, a subbranch may be added at the end of the convolutional layers in the TD model 182 as a regressor, such as an Auxiliary Classifier GAN (AC-GAN). Accordingly, the position regression loss 262 is calculated as the following equation (3):

$$\mathcal{L}_{coord} = \frac{1}{K}(Reg(C) - pos_C)^2 \qquad (3)$$

where $Reg(C)$ denotes the predicted coordinate, $pos_C$ denotes the normalized coordinate of a selected block C, and K is the total number of the selected block.

In such implementations, in addition to the adversarial loss 261 as expressed by the equation (2), the position regression loss 262 as expressed by the equation (3) is used. With the adversarial loss 261, the TD model 182 can focus on local textures of the blocks. With the position regression loss 262, the TD model 182 can learn global consistency for textures. In this way, structural information can be learnt in the texture space, which facilitates generation of high-fidelity textures.

Image Discrimination Model

Processing of the complete texture map 220 in the image space is now described. In the image space, the complete texture map 220 is input to a render 202 to generate a new image of the reference face. In the following, the new image is referred to as a predicted image 230. It is to be understood that although only one predicted image is described, the render 202 may generate multiple predicted images of the reference face. The render 202 may be implemented in any suitable manner. For example, the render 202 may be implemented as a differentiable mesh renderer.

As shown in FIG. 2, a pose selector 204 may be used to select a target pose for the reference face in the predicted image 230. In some implementations, the pose selector 204 may select the target pose randomly and ensure that the target pose is different from an original pose in the training image 171.

In some implementations, the pose selector 204 may determine the target pose based on a distribution of poses of faces in the training dataset 170. For example, the pose selector 204 may calculate the distribution of poses of the faces in the plurality of training images 171, 172 and 173. The target pose is selected based on the calculated distribution randomly. The pose selector 204 may select the target pose based on the calculated distribution randomly but ensure that the target pose is different from the original pose in the training image 171.

In such implementations, target poses in the predicted images can have the same distribution as the poses in the training images. In this way, it is ensured that the ID model 183 is sensitive to textures rather than poses. This is important for the cases where poses of faces in a training dataset is unevenly distributed. For example, a certain training dataset might be biased to front faces. In such cases, if the distribution is not considered, the ID model 183 would distinguish the generated images from the training images based on the different distributions therebetween.

Information concerning the target pose is input to the render 202 from the pose selector 204. As such, the predicted image 230 is rendered by the render 202 based on the target pose and the complete texture map 220.

Continuing with FIG. 2, a boundary mask is applied to the training image 171 to produce a masked training image 240. The boundary mask indicates boundaries of the face in the training image 171. In the masked training image 240, pixels representing the reference face remain unchanged, while pixels representing the background are masked.

The predicted image 230 and the masked training image 240 are input into the ID model 183. The ID model 183 determines a prediction on whether the masked training image 240 and the predicted image 230 are generated images. In other words, the ID model 183 determines a prediction (which is also referred to as "second prediction") on whether each of the training image 171 and the predicted image 230 is a real image or a fake image. Then, an adversarial loss 263 in the image space is determined based on the prediction by the ID mode 183.

In some implementations, the prediction may be determined in terms of patches. The size of the patches reflects the receptive field size of the ID model 183 and is selected to be large enough to capture structural information of a face. The ID model 183 may predict whether a first set of patches in the masked training image 240 and a second set of patches in the predicted image 230 are generated patches. To calculate the adversarial loss 263, a first set of labels corresponding to the first set of patches are determined. Since the training image 171 is raw data, each of the first set of labels indicates that a respective patch of the first set of patches is not a generated patch, that is, a real patch. Therefore, uniform labels are used for the masked training image 240.

Different from the masked training image 240, the predicted image 230 comprises valid pixels and predicted pixels. A valid pixel comprises a visible texture from the training image 171 and a predicted pixel comprises an inferred texture from the complete texture map 220. Generally, in the predicted image 230, the number of predicted pixels is small as compare to the total number of pixels. In other words, the valid pixels (which can be considered as real pixels) and the predicted pixels (which can be considered as fake pixels) are highly unbalanced. Accordingly, a second set of labels corresponding to the second set of patches are determined based on visibility of textures of the second set of patches in the training image 171. Therefore, spatially-varying labels are used for the predicted image 230.

In some implementations, the spatially-varying labels for the predicted image 230 may be determined based on the number of valid pixels. For a given patch of the second set of patches, a ratio of the number of valid pixels in the given patch to the number of pixels in the given patch is determined. If the ratio exceeds a threshold (for example, 0.9), the given patch can be considered as a real patch rather than a generated patch. Accordingly, a first label is assigned to the given patch. If the ratio is below the threshold, the given patch can be considered as a fake patch, i.e., a generated patch. Accordingly, a second label different from the first label is assigned to the given patch. For example, the first label may have a value of 1 and the second label may have a value of 0.

In some implementations, the spatially-varying labels for the predicted image 230 may be determined by using the visibility mask $M_{tex}$. Specifically, a rendered visibility mask $M_{img}$ corresponding to the predicted image 230 is determined as the following equation (4):

$$M_{img} = DR(M_{tex}, p) \qquad (4)$$

where $DR(\cdot)$ denotes the render 202, p denotes the target pose selected by the pose selector 204.

The rendered visibility mask is resized to form a label map. The label map indicates the second set of labels corresponding to the second sets of patches. To obtain the label map, a convolution operation associated with the second sets of patches is performed on the rendered visibility mask $M_{img}$. For example, low-pass filtering followed by stride sampling is performed on the rendered visibility mask $M_{img}$. To reflect the receptive field size of the ID model 183, the same number and size of the convolution kernels as the ID model 183 is used for the low-pass filtering. As a result, a raw label map comprising multiple elements is obtained. An element in the raw label map corresponds to a patch in the predicted image 230 as perceived by the convention kernel. Therefore, a value of the element may be considered as a weighted average of values of pixels in the corresponding patch. Then, a label of 1 is assigned to an element with a value above a threshold (for example, 0.9) to indicate a real patch. A label of 0 is assigned to an element with a value below the threshold to indicate a fake patch. As such, the raw label map is binarized as the label map for the predicted image 230.

In such implementations, the adversarial loss 263 is calculated as the following equations (5) and (6):

$$\mathcal{L}_{img} = \mathop{\mathbb{E}}_{I_{pred}} \left[ (D_I(I_{gt}) - 1)^2 \right] - \mathop{\mathbb{E}}_{I_{pred}, z} \left[ (D_I(I_{pred}) - l_{img})^2 \right] \qquad (5)$$

$$I_{pred} = DR(T_{pred}, p) \qquad (6)$$

where $D_I(\cdot)$ denotes the ID model 183, $I_{gt}$ denotes the ground truth image, i.e. the masked training image 240, $1_{img}$ denotes the label map, i.e., the spatially-varying labels, $I_{pred}$ denotes the predicted image 230, and $T_{pred}$ denotes the complete texture map 220.

Figure 5:
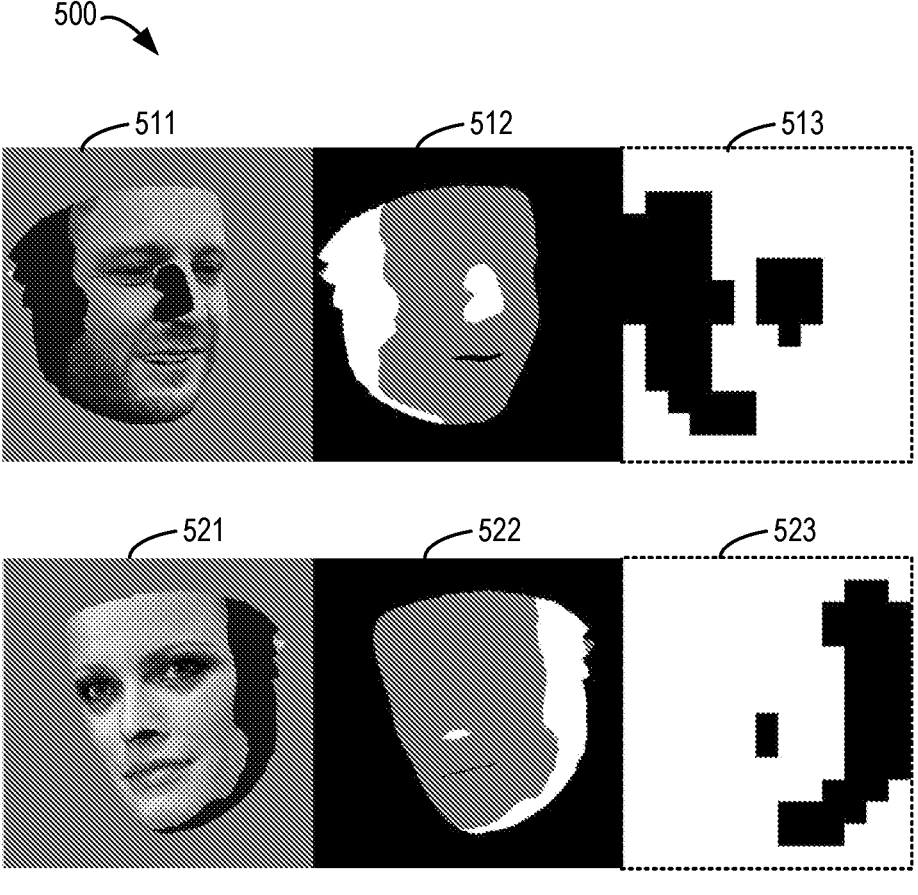
FIG. 5 illustrates example spatially-varying labels in accordance with some implementations of the present disclosure.

To better understand the spatially-varying labels, reference is now made to FIG. 5. FIG. 5 shows a predicted image 511 and a predicted image 521 which are generated by the render 202. The black regions in the predicted images 511 and 521 represent that textures of such regions are invisible in the corresponding training images and such regions are generated based on inferred textures from the complete texture maps. FIG. 5 shows a rendered visibility mask 512 corresponding to the predicted image 511 and a rendered visibility mask 522 corresponding to the predicted image 521. The rendered visibility masks 512 and 522 are generated by using the equation (4). A label map 513 for the predicted image 511 may be generated by performing a convolution operation on the rendered visibility mask 512. Similarly, a label map 523 for the predicted image 521 may be generated by performing a convolution operation on the rendered visibility mask 522.

It is assumed that the predicted images 511 and 521 each have a resolution of 448×448 and the ID model 183 outputs 14×14 predictions. Accordingly, the receptive field size for each prediction is 286×286, which is large enough to capture structural information of a face. In this situation, the label map 513 comprises 14×14 labels corresponding to 14×14 patches in the predicted image 511. Similarly, the label map 523 comprises 14×14 labels corresponding to 14×14 patches in the predicted image 521. A label shown in black indicates a fake patch and a label shown in white indicates a real patch.

In such implementations, through the spatially-varying labels, patches comprising the visible textures and patches lacking the visible textures can be distinguished from each other. In this way, the ID model 183 can focus more on the patches lacking the visible textures.

This can facilitate generation of high-fidelity textures.

Example Total Loss

Reference is now made back to FIG. 2. The TG model 181, the TD model 182 and the ID model 183 are trained based on the adversarial loss 261 in the texture space, the regression loss 262, the adversarial loss 263 in the image space and the self-construction loss (not shown). The total loss $\mathcal{L}_G$ for the TG model 181 may be defined as the following equation (7) and the total loss $\mathcal{L}_D$ for the TD model 182 and the ID model 183 may be defined as the following equation (8):

$$\mathcal{L}_G = w_{img}\mathcal{L}_{img}^G + w_{loc}\mathcal{L}_{loc}^G + w_{coord}\mathcal{L}_{coord} + w_{rec}\mathcal{L}_{rec} \quad (7)$$

$$\mathcal{L}_D = w_{img}\mathcal{L}_{img}^D + w_{loc}\mathcal{L}_{loc}^D + w_{coord}\mathcal{L}_{coord} \quad (8)$$

where $$\mathcal{L}_{img}^G$$

denotes the adversarial loss in the image space for the TG model 181 as expressed by the equation (5), $$\mathcal{L}_{img}^D$$

denotes the adversarial loss in the image space for the TD model 182 and the ID model 183 as expressed by the equation (5), $$\mathcal{L}_{loc}^G$$

denotes the adversarial loss in the texture space for the TG model 181 as expressed by the equation (2), $$\mathcal{L}_{loc}^D$$

denotes the adversarial loss in the texture space for self-construction loss the TD model 182 and the ID model 183 as expressed by the equation (2), $\mathcal{L}_{coord}$ denotes the regression loss as expressed by the equation (3) and $\mathcal{L}_{rec}$ denotes the self-construction loss as expressed by the equation (1). $w_{img}$, $w_{loc}$, $w_{coord}$ and $w_{rec}$ denote weights for corresponding losses.

Through the use of the two discrimination models in the texture space and the image space, texture completion can be learnt without any complete textures in an unsupervised fashion. Detailed texture patterns can be learnt by means of the texture discrimination model in the texture space, while the general face structure, core semantic components, and overall color gradient caused by different illumination conditions can be learnt by means of the image discrimination model in the image space. In this way, the trained texture generation model can generate complete textures with high-fidelity.

Example Methods and Implementations

Figure 6:
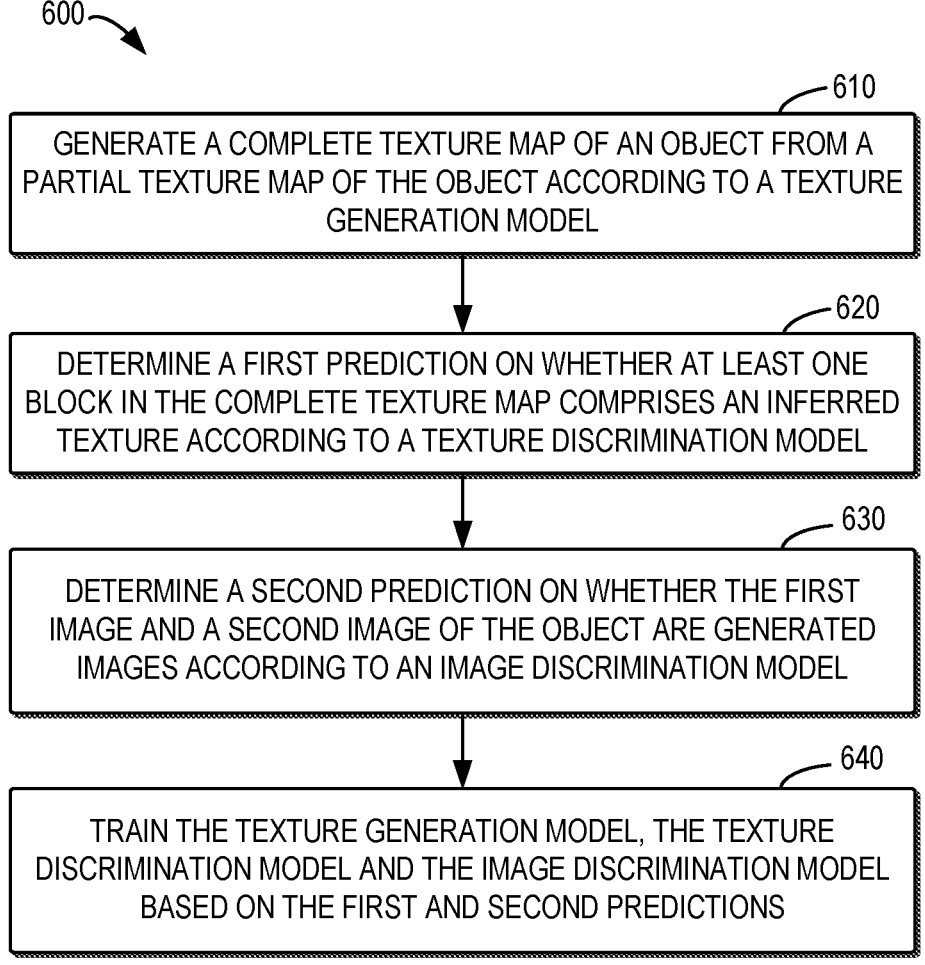
FIG. 6 illustrates a flowchart of a method in accordance with an implementation of the present disclosure.

FIG. 6 illustrates a flow chart of a method 600 according to implementations of the present disclosure. The method 600 may be implemented by the computing device 100, for example, may be implemented at the training module 122 in the memory 120 of the computing device 100.

As shown in FIG. 6, at block 610, the computing device 100 generates a complete texture map of an object from a partial texture map of the object according to a texture generation model. The partial texture map comprises visible textures in a first image of the object and the complete texture map comprises the visible textures and inferred textures. At block 620, the computing device 100 determines a first prediction on whether at least one block in the complete texture map comprises an inferred texture according to a texture discrimination model. At block 630, the computing device 100 determines a second prediction on whether the first image and a second image of the object are generated images according to an image discrimination model. The second image is generated based on the complete texture map. At block 640, the computing device 100 trains the texture generation model, the texture discrimination model and the image discrimination model based on the first and second predictions.

In some implementations, training the texture generation model, the texture discrimination model and the image discrimination model comprises: predicting a position of the at least one block in the complete texture map based on an output of an intermediate layer of the texture discrimination model; and training the texture generation model, the texture discrimination model and the image discrimination model further based on a difference between the predicted position and an actual position of the at least one block in the complete texture map.

In some implementations, the method 600 further comprises: determining a plurality of blocks from the complete texture map, each of the plurality of blocks comprising a plurality of pixels of the complete texture map; determining, for each of the plurality of blocks, a first ratio of the number of valid pixels to the number of the plurality of pixels, a valid pixel comprising a visible texture in the first image; and selecting the at least one block from the plurality of blocks based on respective first ratios determined for the plurality of blocks, the first ratio determined for the at least one selected block exceeding a first threshold or being below a second threshold and the first threshold exceeding the second threshold.

In some implementations, determining the second prediction comprises: determining the second prediction by predicting whether a first set of patches in the first image and a second set of patches in the second image are generated patches according to the image discrimination model. Training the texture generation model, the texture discrimination model and the image discrimination model comprises: determining a first set of labels corresponding to the first set of patches, each of the first set of labels indicating that a respective patch of the first set of patches is not a generated patch; determining a second set of labels corresponding to the second set of patches based on visibility of textures of the second set of patches in the first image; and training the texture generation model, the texture discrimination model and the image discrimination model based on the second prediction, the first set of labels and the second set of labels.

In some implementations, determining the second set of labels corresponding to the second set of patches comprises: generating a visibility mask indicating valid pixels and non-valid pixels in the second image, a valid pixel comprising a visible texture in the first image and a non-valid pixel comprising an inferred texture from the complete texture map; and determining the second set of labels by performing on the visibility mask a convolution operation associated with the second set of patches.

In some implementations, determining the second set of labels corresponding to the second set of patches comprises: determining, for a given patch of the second set of patches, a second ratio of the number of valid pixels in the given patch to the number of pixels in the given patch, a valid pixel comprising a visible texture in the first image; in accordance with a determination that the second ratio exceeds a threshold, assigning a first label to the given patch, the first label indicating that the given patch is not a generated patch; and in accordance with a determination that the second ratio is below the threshold, assigning a second label to the given patch, the second label indicating that the given patch is a generated patch.

In some implementations, the method 600 further comprises: determining a target pose of the object based on a distribution of poses of objects in a plurality of training images comprising the first image; and generating the second image based on the complete texture map and the target pose.

In some implementations, the object comprises a human face.

Figure 7:
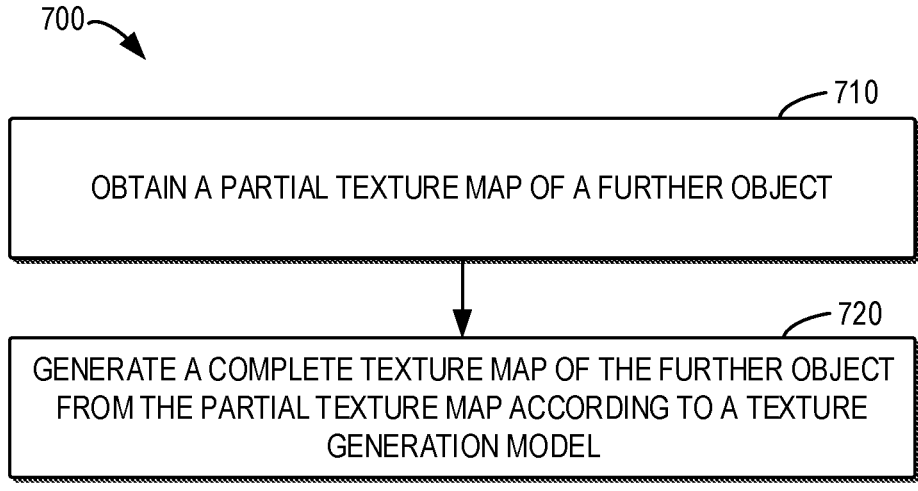
FIG. 7 illustrates a flowchart of another method in accordance with an implementation of the present disclosure.

FIG. 7 illustrates a flow chart of a method 700 according to implementations of the present disclosure. The method 700 may be implemented by the computing device 100 or another computing device. The method 700 is performed during an infer phase.

As shown in FIG. 7, at block 710, the computing device obtains a partial texture map of a further object. The partial texture map comprises visible textures in a third image of the further object. The partial texture map may be a map generated by any suitable method. Alternatively, the partial texture map may be generated by the computing device as described above with respect to the converter 201 of FIG. 2. For example, a partial texture map 192 corresponding to a face image 191 may be generated from the face image 191.

At block 720, the computing device generates a complete texture map of the further object from the partial texture map according to a texture generation model. The texture generation model is trained by the method 600 as described above. The complete texture map comprises the visible textures in the third image and inferred textures by the texture generation model. For example, the partial texture map 192 is input to the trained TG model 181 and the trained TG model 181 generates a complete texture map 193 of the face in the face image 191 from the partial texture map 192.

In some implementations, the method 700 further comprises determining a target pose of the further object; and generating a fourth image of the further object based on the complete texture map and the target pose. The target pose is different from the pose of the further object in the third image. For example, a new pose of the face in the face image 191 may be determined. A new face image of the face may be generated based on the new pose and the complete texture map 193.

Some example implementations of the present disclosure are listed below.

In a first aspect, the present disclosure provides a computer-implemented method. The method comprises: generating a complete texture map of an object from a partial texture map of the object according to a texture generation model, the partial texture map comprising visible textures in a first image of the object and the complete texture map comprising the visible textures and inferred textures; determining a first prediction on whether at least one block in the complete texture map comprises an inferred texture according to a texture discrimination model; determining a second prediction on whether the first image and a second image of the object are generated images according to an image discrimination model, the second image generated based on the complete texture map; and training the texture generation model, the texture discrimination model and the image discrimination model based on the first and second predictions.

In some implementations, training the texture generation model, the texture discrimination model and the image discrimination model comprises: predicting a position of the at least one block in the complete texture map based on an output of an intermediate layer of the texture discrimination model; and training the texture generation model, the texture discrimination model and the image discrimination model further based on a difference between the predicted position and an actual position of the at least one block in the complete texture map.

In some implementations, the method further comprises: determining a plurality of blocks from the complete texture map, each of the plurality of blocks comprising a plurality of pixels of the complete texture map; determining, for each of the plurality of blocks, a first ratio of the number of valid pixels to the number of the plurality of pixels, a valid pixel comprising a visible texture in the first image; and selecting the at least one block from the plurality of blocks based on respective first ratios determined for the plurality of blocks, the first ratio determined for the at least one selected block exceeding a first threshold or being below a second threshold and the first threshold exceeding the second threshold.

In some implementations, determining the second prediction comprises: determining the second prediction by predicting whether a first set of patches in the first image and a second set of patches in the second image are generated patches according to the image discrimination model. Training the texture generation model, the texture discrimination model and the image discrimination model comprises: determining a first set of labels corresponding to the first set of patches, each of the first set of labels indicating that a respective patch of the first set of patches is not a generated patch; determining a second set of labels corresponding to the second set of patches based on visibility of textures of the second set of patches in the first image; and training the texture generation model, the texture discrimination model and the image discrimination model based on the second prediction, the first set of labels and the second set of labels.

In some implementations, determining the second set of labels corresponding to the second set of patches comprises: generating a visibility mask indicating valid pixels and non-valid pixels in the second image, a valid pixel comprising a visible texture in the first image and a non-valid pixel comprising an inferred texture from the complete texture map; and determining the second set of labels by performing on the visibility mask a convolution operation associated with the second set of patches.

In some implementations, determining the second set of labels corresponding to the second set of patches comprises: determining, for a given patch of the second set of patches, a second ratio of the number of valid pixels in the given patch to the number of pixels in the given patch, a valid pixel comprising a visible texture in the first image; in accordance with a determination that the second ratio exceeds a threshold, assigning a first label to the given patch, the first label indicating that the given patch is not a generated patch; and in accordance with a determination that the second ratio is below the threshold, assigning a second label to the given patch, the second label indicating that the given patch is a generated patch.

In some implementations, the method further comprises: determining a target pose of the object based on a distribution of poses of objects in a plurality of training images comprising the first image; and generating the second image based on the complete texture map and the target pose.

In some implementations, the object comprises a human face.

In a second aspect, the present disclosure provides a computer-implemented method. The method comprises: obtaining a partial texture map of a further object, the partial texture map comprising visible textures in a third image of the further object; and generating a complete texture map of the further object from the partial texture map according to a texture generation model, the texture generation model trained by the method of the first aspect, and the complete texture map comprising the visible textures in the third image and inferred textures.

In some implementations, the method further comprises: determining a target pose of the further object; and generating a fourth image of the further object based on the complete texture map and the target pose. The target pose of the further object is different from the pose of the further object in the third image.

In a third aspect, the present disclosure provides an electronic device. The device comprises a processing unit; and a memory coupled to the processing unit and having instructions stored thereon, the instructions, when executed by the processing unit, causing the device to perform acts comprising: generating a complete texture map of an object from a partial texture map of the object according to a texture generation model, the partial texture map comprising visible textures in a first image of the object and the complete texture map comprising the visible textures and inferred textures; determining a first prediction on whether at least one block in the complete texture map comprises an inferred texture according to a texture discrimination model; determining a second prediction on whether the first image and a second image of the object are generated images according to an image discrimination model, the second image generated based on the complete texture map; and training the texture generation model, the texture discrimination model and the image discrimination model based on the first and second predictions.

In some implementations, training the texture generation model, the texture discrimination model and the image discrimination model comprises: predicting a position of the at least one block in the complete texture map based on an output of an intermediate layer of the texture discrimination model; and training the texture generation model, the texture discrimination model and the image discrimination model further based on a difference between the predicted position and an actual position of the at least one block in the complete texture map.

In some implementations, the acts further comprise: determining a plurality of blocks from the complete texture map, each of the plurality of blocks comprising a plurality of pixels of the complete texture map; determining, for each of the plurality of blocks, a first ratio of the number of valid pixels to the number of the plurality of pixels, a valid pixel comprising a visible texture in the first image; and selecting the at least one block from the plurality of blocks based on respective first ratios determined for the plurality of blocks, the first ratio determined for the at least one selected block exceeding a first threshold or being below a second threshold and the first threshold exceeding the second threshold.

In some implementations, determining the second prediction comprises: determining the second prediction by predicting whether a first set of patches in the first image and a second set of patches in the second image are generated patches according to the image discrimination model. Training the texture generation model, the texture discrimination model and the image discrimination model comprises: determining a first set of labels corresponding to the first set of patches, each of the first set of labels indicating that a respective patch of the first set of patches is not a generated patch; determining a second set of labels corresponding to the second set of patches based on visibility of textures of the second set of patches in the first image; and training the texture generation model, the texture discrimination model and the image discrimination model based on the second prediction, the first set of labels and the second set of labels.

In some implementations, determining the second set of labels corresponding to the second set of patches comprises: generating a visibility mask indicating valid pixels and non-valid pixels in the second image, a valid pixel comprising a visible texture in the first image and a non-valid pixel comprising an inferred texture from the complete texture map; and determining the second set of labels by performing on the visibility mask a convolution operation associated with the second set of patches.

In some implementations, determining the second set of labels corresponding to the second set of patches comprises: determining, for a given patch of the second set of patches, a second ratio of the number of valid pixels in the given patch to the number of pixels in the given patch, a valid pixel comprising a visible texture in the first image; in accordance with a determination that the second ratio exceeds a threshold, assigning a first label to the given patch, the first label indicating that the given patch is not a generated patch; and in accordance with a determination that the second ratio is below the threshold, assigning a second label to the given patch, the second label indicating that the given patch is a generated patch.

In some implementations, the acts further comprise: determining a target pose of the object based on a distribution of poses of objects in a plurality of training images comprising the first image; and generating the second image based on the complete texture map and the target pose.

In some implementations, the object comprises a human face.

In a fourth aspect, the present disclosure provides an electronic device. The device comprises a processing unit; and a memory coupled to the processing unit and having instructions stored thereon, the instructions, when executed by the processing unit, causing the device to perform acts comprising: obtaining a partial texture map of a further object, the partial texture map comprising visible textures in a third image of the further object; and generating a complete texture map of the further object from the partial texture map according to a texture generation model, the texture generation model trained by the method of the first aspect, and the complete texture map comprising the visible textures in the third image and inferred textures.

In some implementations, the method further comprises: determining a target pose of the further object; and generating a fourth image of the further object based on the complete texture map and the target pose. The target pose of the further object is different from the pose of the further object in the third image.

In a fifth aspect, the present disclosure provides a computer program product being tangibly stored on a non-transient computer storage medium and comprising machine-executable instructions which, when executed by a device, cause the device to perform the method of the first aspect.

In a sixth aspect, the present disclosure provides a computer program product being tangibly stored on a non-transient computer storage medium and comprising machine-executable instructions which, when executed by a device, cause the device to perform the method of the second aspect.

In a seventh aspect, the present disclosure provides a computer readable medium having machine-executable instructions stored thereon which, when executed by a device, cause a device to perform one or more implementations of the method of the first aspect.

In an eighth aspect, the present disclosure provides a computer readable medium having machine-executable instructions stored thereon which, when executed by a device, cause a device to perform one or more implementations of the method of the second aspect.

The functionalities described herein can be performed, at least in part, by one or more hardware logic components. For example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the present disclosure may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A computer-implemented method comprising:
   generating a complete texture map of an object from a partial texture map of the object according to a texture generation model, the partial texture map comprising visible textures in a first image of the object and the complete texture map comprising the visible textures and inferred textures;
   determining, for at least one block in the complete texture map, a first prediction on whether the at least one block comprises an inferred texture according to a texture discrimination model;
   determining a second prediction on whether the first image and a second image of the object are generated images according to an image discrimination model, the second image generated based on the complete texture map, the second prediction being determined by predicting whether a first set of patches in the first image and a second set of patches in the second image are generated patches according to the image discrimination model; and
   training the texture generation model, the texture discrimination model and the image discrimination model based on the first and second predictions by:
      determining a first set of labels corresponding to the first set of patches, each of the first set of labels indicating that a respective patch of the first set of patches is not a generated patch,
      determining a second set of labels corresponding to the second set of patches based on visibility of textures of the second set of patches in the first image, and
      training the texture generation model, the texture discrimination model and the image discrimination model based on the second prediction, the first set of labels and the second set of labels.

2. The method of claim 1, wherein training the texture generation model, the texture discrimination model and the image discrimination model comprises:
   predicting a position of the at least one block in the complete texture map based on an output of an intermediate layer of the texture discrimination model; and
   training the texture generation model, the texture discrimination model and the image discrimination model further based on a difference between the predicted position and an actual position of the at least one block in the complete texture map.

3. The method of claim 1, further comprising:
   determining a plurality of blocks from the complete texture map, each of the plurality of blocks comprising a plurality of pixels of the complete texture map;
   determining, for each of the plurality of blocks, a first ratio of the number of valid pixels to the number of the plurality of pixels, a valid pixel comprising a visible texture in the first image; and selecting the at least one block from the plurality of blocks based on respective first ratios determined for the plurality of blocks, the first ratio determined for the at least one selected block exceeding a first threshold or being below a second threshold and the first threshold exceeding the second threshold.

4. The method of claim 1, wherein determining the second set of labels corresponding to the second set of patches comprises:

generating a visibility mask indicating valid pixels and non-valid pixels in the second image, a valid pixel comprising a visible texture in the first image and a non-valid pixel comprising an inferred texture from the complete texture map; and determining the second set of labels by performing on the visibility mask a convolution operation associated with the second set of patches.

5. The method of claim 1, wherein determining the second set of labels corresponding to the second set of patches comprises:

determining, for a given patch of the second set of patches, a second ratio of the number of valid pixels in the given patch to the number of pixels in the given patch, a valid pixel comprising a visible texture in the first image;

in accordance with a determination that the second ratio exceeds a threshold, assigning a first label to the given patch, the first label indicating that the given patch is not a generated patch; and in accordance with a determination that the second ratio is below the threshold, assigning a second label to the given patch, the second label indicating that the given patch is a generated patch.

6. The method of claim 1, further comprising:

determining a target pose of the object based on a distribution of poses of objects in a plurality of training images comprising the first image; and generating the second image based on the complete texture map and the target pose.

7. The method of claim 1, further comprising:

obtaining a partial texture map of a further object, the partial texture map comprising visible textures in a third image of the further object; and after training of the texture generation model, generating a complete texture map of the further object from the partial texture map according to the texture generation model, the complete texture map comprising the visible textures in the third image and inferred textures.

8. An electronic device, comprising:

at least one processing unit; and at least one memory coupled to the at least one processing unit and having instructions stored thereon, the instructions, when executed by the processing unit, causing the device to perform acts comprising:

generating a complete texture map of an object from a partial texture map of the object according to a texture generation model, the partial texture map comprising visible textures in a first image of the object and the complete texture map comprising the visible textures and inferred textures;

determining, for at least one block in the complete texture map, a first prediction on whether the at least one block comprises an inferred texture according to a texture discrimination model;

determining a second prediction on whether the first image and a second image of the object are generated images according to an image discrimination model, the second image generated based on the complete texture map, the second prediction being determined by predicting whether a first set of patches in the first image and a second set of patches in the second image are generated patches according to the image discrimination model; and training the texture generation model, the texture discrimination model and the image discrimination model based on the first and second predictions by:

determining a first set of labels corresponding to the first set of patches, each of the first set of labels indicating that a respective patch of the first set of patches is not a generated patch, determining a second set of labels corresponding to the second set of patches based on visibility of textures of the second set of patches in the first image, and training the texture generation model, the texture discrimination model and the image discrimination model based on the second prediction, the first set of labels, and the second set of labels.

9. The device of claim 8, wherein training the texture generation model, the texture discrimination model and the image discrimination model comprises:

predicting a position of the at least one block in the complete texture map based on an output of an intermediate layer of the texture discrimination model; and training the texture generation model, the texture discrimination model and the image discrimination model further based on a difference between the predicted position and an actual position of the at least one block in the complete texture map.

10. The device of claim 8, wherein the acts further comprises:

determining a plurality of blocks from the complete texture map, each of the plurality of blocks comprising a plurality of pixels of the complete texture map;

determining, for each of the plurality of blocks, a first ratio of the number of valid pixels to the number of the plurality of pixels, a valid pixel comprising a visible texture in the first image; and selecting the at least one block from the plurality of blocks based on respective first ratios determined for the plurality of blocks, the first ratio determined for the at least one selected block exceeding a first threshold or being below a second threshold and the first threshold exceeding the second threshold.

11. The device of claim 8, wherein the acts further comprises:

determining a target pose of the object based on a distribution of poses of objects in a plurality of training images comprising the first image; and generating the second image based on the complete texture map and the target pose.

12. The electronic device of claim 8, the acts further comprising:

obtaining a partial texture map of a further object, the partial texture map comprising visible textures in a third image of the further object; and after training of the texture generation model, generating a complete texture map of the further object from the partial texture map according to the texture generation model, the complete texture map comprising the visible textures in the third image and inferred textures.

13. A non-transitory computer storage medium comprising computer-executable instructions which, when executed by a device, cause the device to perform acts comprising:

generating a complete texture map of an object from a partial texture map of the object according to a texture generation model, the partial texture map comprising visible textures in a first image of the object and the complete texture map comprising the visible textures and inferred textures, determining, for at least one block in the complete texture map, a first prediction on whether the at least one block comprises an inferred texture according to a texture discrimination model;

determining a second prediction on whether the first image and a second image of the object are generated images according to an image discrimination model, the second image generated based on the complete texture map, the second prediction being determined by predicting whether a first set of patches in the first image and a second set of patches in the second image are generated patches according to the image discrimination model; and training the texture generation model, the texture discrimination model and the image discrimination model based on the first and second predictions by:

determining a first set of labels corresponding to the first set of patches, each of the first set of labels indicating that a respective patch of the first set of patches is not a generated patch, determining a second set of labels corresponding to the second set of patches based on visibility of textures of the second set of patches in the first image, and training the texture generation model, the texture discrimination model and the image discrimination model based on the second prediction, the first set of labels, and the second set of labels.

14. The non-transitory computer storage medium of claim 13, further comprising computer-executable instructions which, when executed by a device, cause the device to perform acts comprising:

obtaining a partial texture map of a further object, the partial texture map comprising visible textures in a third image of the further object; and after training of the texture generation model, generating a complete texture map of the further object from the partial texture map according to the texture generation model, the complete texture map comprising the visible textures in the third image and inferred textures.

* * * * *